United States Patent
Makino et al.

(10) Patent No.: US 6,668,202 B2
(45) Date of Patent: Dec. 23, 2003

(54) POSITION CONTROL SYSTEM AND VELOCITY CONTROL SYSTEM FOR STAGE DRIVING MECHANISM

(75) Inventors: Kenichi Makino, Hiratsuka (JP); Masayuki Yamamoto, Nishitokyo (JP); Yoshiyuki Tomita, Hiratsuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 106 days.

(21) Appl. No.: 09/989,531

(22) Filed: Nov. 21, 2001

(65) Prior Publication Data

US 2003/0097193 A1 May 22, 2003

(51) Int. Cl.[7] .............................................. G05B 19/18
(52) U.S. Cl. ............................ 700/56; 700/60; 700/61; 700/63
(58) Field of Search .............................. 700/13, 28, 32, 700/38, 41, 42, 43, 44, 45, 56, 60, 63, 70, 170, 186, 302, 69, 71, 193; 318/568.18, 628

(56) References Cited

U.S. PATENT DOCUMENTS

| | | | | |
|---|---|---|---|---|
| 5,239,248 A | * | 8/1993 | Shimada et al. | 318/568.12 |
| 5,511,930 A | * | 4/1996 | Sato et al. | 414/676 |
| 5,586,221 A | * | 12/1996 | Isik et al. | 706/23 |
| 5,609,136 A | * | 3/1997 | Tuken | 123/357 |
| 5,710,498 A | * | 1/1998 | Yutkowitz et al. | 318/632 |
| 6,308,106 B1 | * | 10/2001 | Ameri et al. | 700/45 |
| 6,330,484 B1 | * | 12/2001 | Qin | 700/50 |
| 6,411,944 B1 | * | 6/2002 | Ulyanov | 706/13 |
| 6,424,873 B1 | * | 7/2002 | Przybylski | 700/42 |
| 6,564,110 B1 | * | 5/2003 | Makino et al. | 700/56 |
| 6,584,367 B1 | * | 6/2003 | Makino et al. | 700/60 |

FOREIGN PATENT DOCUMENTS

| | | |
|---|---|---|
| EP | 0 967 535 A1 | 12/1999 |
| JP | 05-122970 | 5/1993 |
| JP | 05-308044 | 11/1993 |
| JP | 7-249564 | 9/1995 |
| JP | 08-331879 | 12/1996 |
| JP | 09-238489 | 9/1997 |
| JP | 10-254550 | 9/1998 |
| JP | 10-277771 | 10/1998 |
| JP | 11-31014 | 2/1999 |
| JP | 2000-148207 | 5/2000 |

* cited by examiner

Primary Examiner—Anil Khatri
Assistant Examiner—Ronald D Hartman, Jr.
(74) Attorney, Agent, or Firm—Arent Fox Kintner Plotkin & Kahn, PLLC

(57) ABSTRACT

A position control system includes a PID controller for generating a current target value of a linear motor from a difference between a positional detected value and a positional command value, and a disturbance observer. The disturbance observer includes a signal processing unit comprising a filter for filtering a torque command value for a motor drive and an input torque estimating filter carrying out estimation for obtaining an estimated input load torque from the detected positional value. An inverse model of a motor torque constant calculates an estimated disturbance load torque from the difference between the filtered torque command value and the estimated input load torque and generates a correction value for the current target value so as to cancel a disturbance torque on the basis of the estimated disturbance load torque being calculated.

14 Claims, 5 Drawing Sheets

POSITION CONTROL SYSTEM AND VELOCITY CONTROL SYSTEM FOR STAGE DRIVING MECHANISM

BACKGROUND OF THE INVENTION

1. Field of the Invention

The present invention relates to a position control system and a velocity control system for controlling movement and positioning of a mechanism having a motor and a load element, and in particular relates to a position control system and a velocity control system suitable for controlling a stage driving mechanism which is driven at least in one axial direction.

2. Description of the Related Art

As this kind of position control system, control systems using a PID control method or a PID and FF control method are known, for example.

As will be described in detail later, in a stage driving mechanism employing a control system of the PID control method or the PID and FF control method, the performance such as a constant velocity and a positioning time may be degraded by the disturbance due to the effect of external unnecessary vibration, motor cogging, and tension of a cable system. In order to suppress the disturbance, a measure to increase a gain of a servo system has been taken. However, when increasing the gain of the servo system, an instability problem of the control system is arisen.

In such situations, the practical point for suppressing the disturbance is measures such as high-grade vibration proof, a high-performance motor with small disturbance and improvement in cable mounting, and improvements in a mechanical system with high accuracy. Such measures, however, increase manufacturing cost.

SUMMARY OF THE INVENTION

Accordingly, it is an object of the present invention to provide a position control system for a stage driving mechanism, which is capable of improving performance in a constant velocity and a positioning time by estimating and compensating the disturbance to the system without changing a hardware structure of the system.

It is another object of the present invention to provide a velocity control system for a stage driving mechanism having the performance mentioned above.

The present invention provides a position control system of a stage driving mechanism that drives a stage at least in one-axial direction, and the position control system comprises a position detector for detecting a position of the stage and a feedback control system for controlling a motor, which is a driving source of the stage, on the basis of a detected positional value obtained from the position detector and a positional command value. In accordance with a first aspect of the present invention, the position control system comprises a PID controller for generating a current target value for the motor from the difference between the detected positional value and the positional command value and a disturbance observer. The disturbance observer comprises a signal processing unit for carrying out high-speed calculation according to a predetermined program. The signal processing unit has a filtering function to filter a torque command value for the motor, an input torque estimating and filtering function carrying out estimation for obtaining an estimated input load torque from the detected positional value, and a function to calculate an estimated disturbance load torque from the difference between the filtered torque command value and the estimated input load torque and to generate a correction value for the current target value so as to cancel a disturbance torque on the basis of the estimated disturbance load torque.

A position control system according to a second aspect of the present invention is applied to a stage driving mechanism having a linear motor as a driving source. In this case, the feed back control system comprises the position detector, a first calculator for calculating a first difference between the detected positional value and the positional command value, a PID controller connected to the first calculator for generating a current target value for the linear motor from the first difference, and a motor drive connected to the PID controller for generating a torque command value for the linear motor. The position control system further comprises a second calculator inserted and connected between the PID controller and the motor drive, and a disturbance observer connected to the output side of the second calculator, the output side of the position detector, and one input side of the second calculator. The disturbance observer comprises a signal processing unit for carrying out high-speed calculation according to a predetermined program. The signal processing means comprises a low-pass filter for filtering the torque command value for the linear motor, an input torque estimating filter carrying out estimation for obtaining an estimated input load torque from the detected positional value, a third calculator for calculating a third difference between the filtered torque command value and the estimated input load torque, and an inverse model of a motor torque constant for calculating an estimated disturbance load torque from the third difference and for generating a correction value for the current target value so as to cancel a disturbance torque on the basis of the estimated disturbance load torque calculated above. The second calculator calculates a second difference by subtracting the output value of the inverse model of the motor torque constant from the output value of the PID controller and produces the second difference to the motor drive as a current command value.

The present invention also provides a velocity control system of a stage driving mechanism that drives a stage at least in one-axial direction, and the velocity control system comprises a velocity detector for detecting a velocity of the stage and a feedback control system for controlling a motor, which is a driving source of the stage, on the basis of a detected velocity value obtained from the velocity detector and a velocity command value. In accordance with a third aspect of the present invention, the velocity control system comprises a PID controller for generating a current target value for the motor from the difference between the detected velocity value and the velocity command value and a disturbance observer. The disturbance observer comprises a signal processing unit for carrying out high-speed calculation according to a predetermined program. The signal processing unit has a filtering function to filter a torque command value for the motor, an input torque estimating and filtering function carrying out estimation for obtaining an estimated input load torque from the detected velocity value, and a function to calculate an estimated disturbance load torque from the difference between the filtered torque command value and the estimated input load torque and to generate a correction value for the current target value so as to cancel a disturbance torque on the basis of the estimated disturbance load torque calculated above.

A velocity control system according to a fourth aspect of the present invention is applied to a stage driving mechanism having a linear motor as a driving source. In this case, the feedback control system comprises the velocity detector, a first calculator for calculating a first difference between the detected velocity value and the velocity command value, a PID controller connected to the first calculator for generating a current target value for the linear motor from the first difference, and a motor drive connected to the PID controller for generating a torque command value for the linear motor. The velocity control system further comprises a second calculator inserted and connected between the PID controller and the motor drive and a disturbance observer connected to the output side of the second calculator, the output side of the position detector, and one input side of the second calculator. The disturbance observer comprises a signal processing unit for carrying out high-speed calculation according to a predetermined program. The signal processing unit comprises a filter for filtering the torque command value for the linear motor, an input torque estimating filter carrying out estimation for obtaining an estimated input load torque from the detected velocity value, a third calculator for calculating a third difference between the filtered torque command value and the estimated input load torque, and an inverse model of a motor torque constant for calculating an estimated disturbance load torque from the third difference and for generating a correction value for the current target value so as to cancel a disturbance torque on the basis of the estimated disturbance load torque calculated above. The second calculator calculates a second difference by subtracting the output value of the inverse model of the motor torque constant from the output value of the PID controller and produces the second difference to the motor drive as a current command value.

DESCRIPTION OF THE PREFERRED EMBODIMENTS

In order to facilitate to understand the present invention, a conventional position control system for a stage driving mechanism will be described. As a conventional position control system for a stage driving mechanism, control systems employing a PID control method shown in FIG. 1 or a PID and FF control method shown in FIG. 2 are known.

Figure 1:
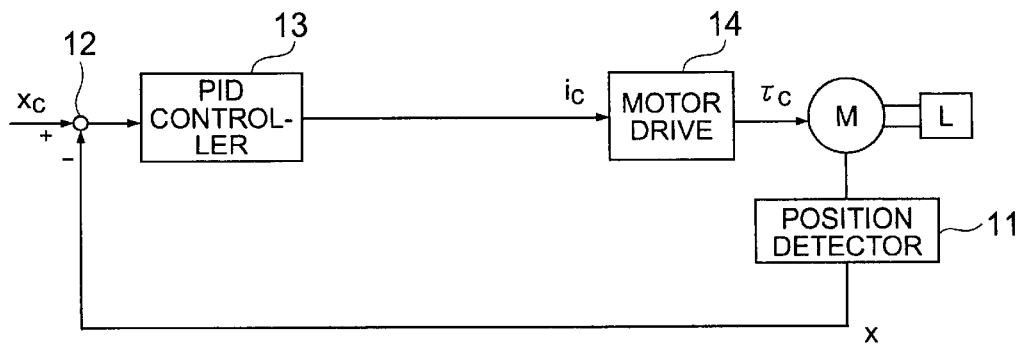
FIG. 1 is a block diagram of a position control system employing a conventional PID control method.

Referring to FIG. 1, in the PID control method, a motor M for driving a stage, which is a load L, has a position detector 11 so as to detect a stage position. A positional detected value x detected in the position detector 11 is fed back to a subtractor 12. In the subtractor 12, the positional detected value x and a positional command value $x_c$ are input. To the output of the subtractor 12, a PID controller 13 is connected, and to the output of the PID controller 13, a motor drive 14 is connected. The output of the motor drive 14 is supplied to the motor M.

In the PID control method, the difference between the positional command value $x_c$ and the positional detected value x is calculated by the subtractor 12, so that the difference signal is input in the PID controller 13. The PID controller 13 provides a current target value $i_c$ to the motor drive 14 according to the difference signal. The motor drive 14 outputs a torque command value $\tau_c$.

Figure 2:
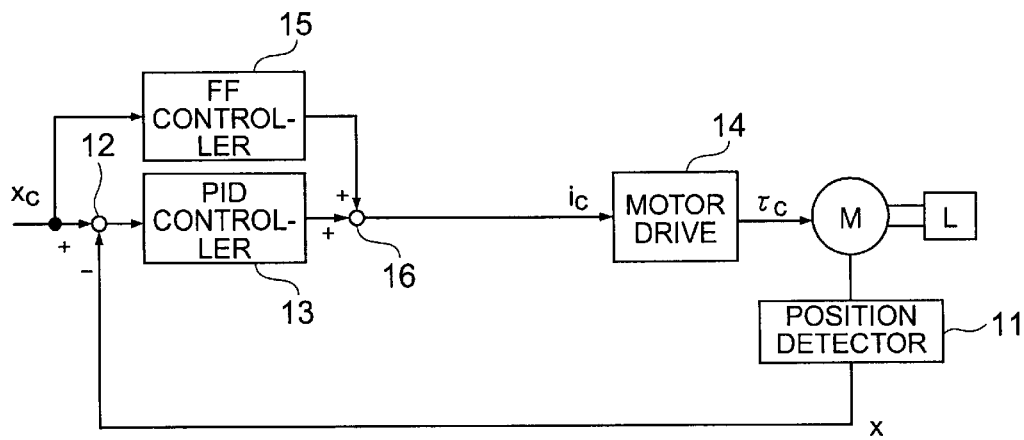
FIG. 2 is a block diagram of a position control system employing a conventional PID and FF control method.

In FIG. 2, like references designates like elements common to FIG. 1. In the PID and FF control method, an FF controller 15 is connected to the PID controller 13 in parallel, and an adder 16 is connected to the output side of the PID controller 13. The output of the FF controller 15 is added to the output of the PID controller 13 by the adder 16. The FF controller 15 multiplies a predetermined control gain by the positional command value $x_c$ so as to make the positional detected value x coincide with the positional command value $x_c$.

In the stage driving mechanism employing the PID control method or the PID and FF control method, the performance such as a constant velocity and a positioning time is degraded by the disturbance due to effects of external unnecessary vibration, motor cogging, and tension of a cable system. In order to suppress the disturbance, a measure to increase a gain of a servo system has been taken. However, when increasing the gain of the servo system, an instability problem of the control system is arisen.

In such situations, the practical point for suppressing the disturbance is measures such as high-grade vibration proof, a high-performance motor with small disturbance and improvement in cable mounting, and improvements in a mechanical system with high accuracy. Such measures, however, increase manufacturing cost.

Figure 3:
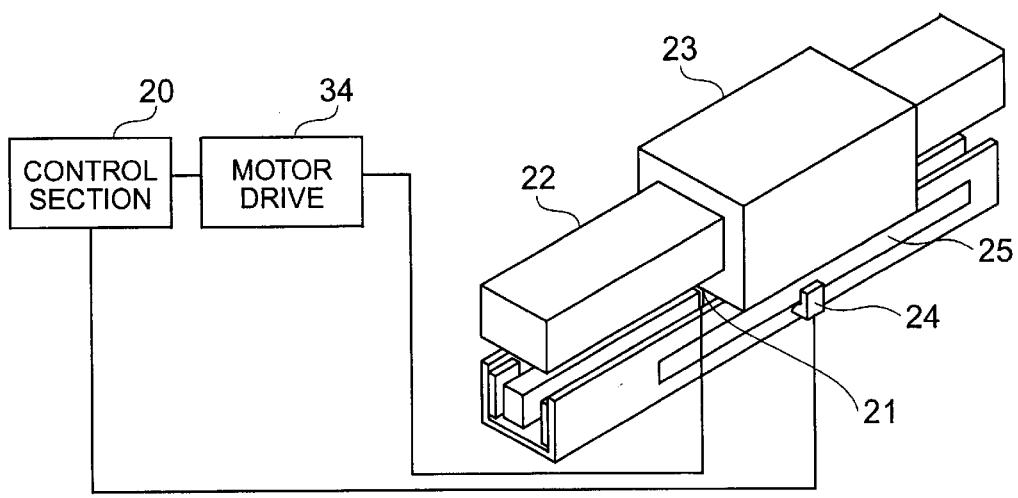
FIG. 3 is a drawing showing a high-precision stage driving mechanism for one-axis.

Referring now to FIG. 3, a stage driving mechanism with high performance and accuracies for one-axis will be described. The high-precision stage driving mechanism may have various structures. In general, a stage driving mechanism for an X-axis and a stage driving mechanism for a Y-axis are stacked together perpendicularly to each other to form an X-Y stage driving mechanism. For the convenience of description, one-axis will be described with reference to the drawing.

The high-precision stage driving mechanism has the following structure. A driving system including a linear motor 21 and a guide system including a slide guide 22 are equipped on a base member (not shown). A movable stage 23 is movably assembled to the slide guide 22. A work (not shown) is placed on the movable stage 23.

The base member is made of a material such as aluminum, cast iron, and granite. In the driving system, a rotation-to-linear motion converter using a rotational motor and a ball screw may also be used instead of the linear motor for directly achieving linear motion. In the guide system, contact-type ball/roller bearings or static air bearings (air slider) are used. For the high-precision system, the static air bearing is advantageous.

Such a high-precision stage driving mechanism may also be applied to the present invention. When considering the application of a disturbance observer according to the present invention which will be described later, because the disturbance observe requires high mechanical rigidity of each element, the high-precision stage driving mechanism of the direct driving structure utilizing the linear motor and the static air bearings may be most effective.

The positional detection of the movable stage 23 is performed by a linear encoder 24. In such a linear motor, a movable section has the linear encoder 24 and a guide section (fixed section) has a linear scale 25, so that a relative position is calculated by counting the number of pulses corresponding to a travel. Other than the combination of the linear scale and the linear encoder, by a laser interferometer, for example, the same function may also be certainly achieved.

In a control section 20, a high-speed processor such as a digital signal processor (referred to as DSP for short below) is used. The control section 20 can be realized by a general-purpose servo-control board having an analogous output board for supplying a calculated result and an input board for receiving a detected signal from the linear encoder 24 while having the PID controller 13 or the PID controller 13 and the FF controller 15 as well, described in FIGS. 1 and 2.

A position control system or a velocity control system according to the present invention is realized by using the general-purpose servo-control board described above and by further adding a disturbance observer control program to the servo-control board.

Figure 4:
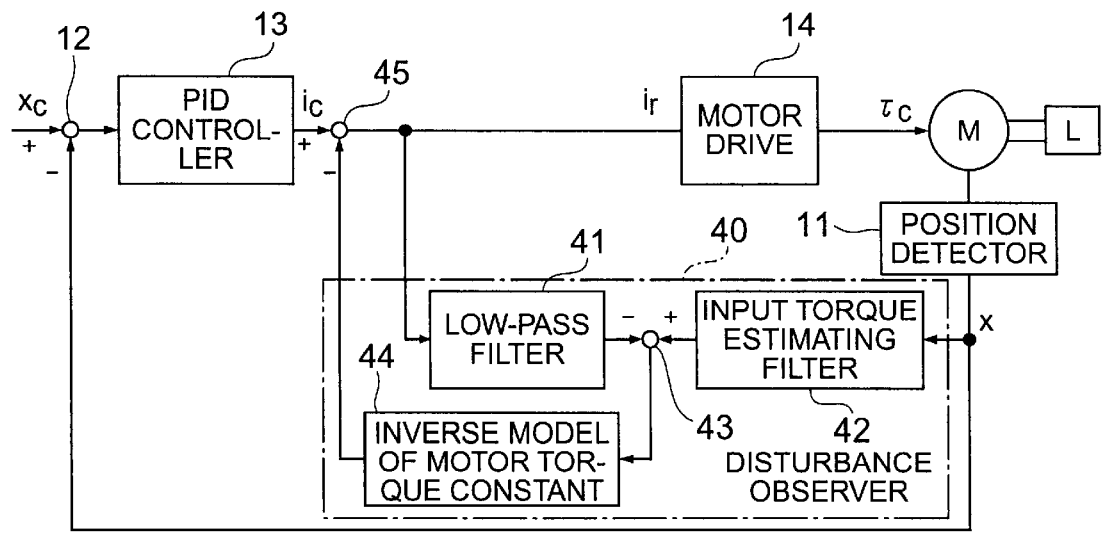
FIG. 4 is a block diagram of a position control system employing a PID control method according to a first embodiment of the present invention.

Referring to FIG. 4, a first embodiment in which a position control system employing the PID control method is applied to the present invention will be described. As described above, in the PID control method, the motor M for driving the stage, which is the load L, has the position detector 11 so as to detect a stage position. A positional detected value x detected in the position detector 11 is fed back to the subtractor 12 (a first calculator). In the subtractor 12, the positional detected value x and the positional command value $x_c$ are input, so that the difference (a first difference) between these values is calculated. To the output side of the subtractor 12, the PID controller 13 is connected, and to the output side of the PID controller 13, the motor drive 14 is connected. The output of the motor drive 14 is supplied to the motor M.

The control section 20 shown in FIG. 3 comprises the PID controller 13, a disturbance observer 40, and a subtractor 45 (a second calculator). To the output side of the PID controller 13, the subtractor 45 is connected. The disturbance observer 40 is connected to one of inputs and the output side of the subtractor 45 and to the output side of the position detector 11. The PID controller 13 performs a proportional action (P), integral action (I), and differential action (D) on the deviation ($x_c$-x) between the positional command value $x_c$ and the positional detected value x so that they coincide with each other, thereby calculating the current target value $\tau_c$ for the motor drive 14.

The disturbance observer 40 comprises a low-pass filter 41, an input torque estimating filter 42, a subtractor 43 (a third calculator), and an inverse model of a motor torque constant 44. In the disturbance observer 40, the difference (a third difference) between a torque command value $\tau_c$ filtered by the low-pas filter 41 for the motor drive 14 and an estimated input load torque estimated by the input torque estimating filter 42 from the positional detected value x is calculated by the subtractor 43. Also, in the disturbance observer 40, a current equivalent to an estimated disturbance load torque is also calculated by the inverse model of a motor torque constant 44 from the difference obtained in the subtractor 43. By subtracting the current calculated by the subtractor 45 from the current target value $i_c$, the current target value $i_c$ is corrected so as to cancel the disturbance torque, so that a current command value $i_r$ for the motor drive 14 is calculated. In addition, while the current command value $i_r$ is given to the motor drive 14, the low-pass filter 41 obtains a torque command value $x_c$ by multiplying the current command value $i_r$ by a constant $K_t$.

Figure 5:
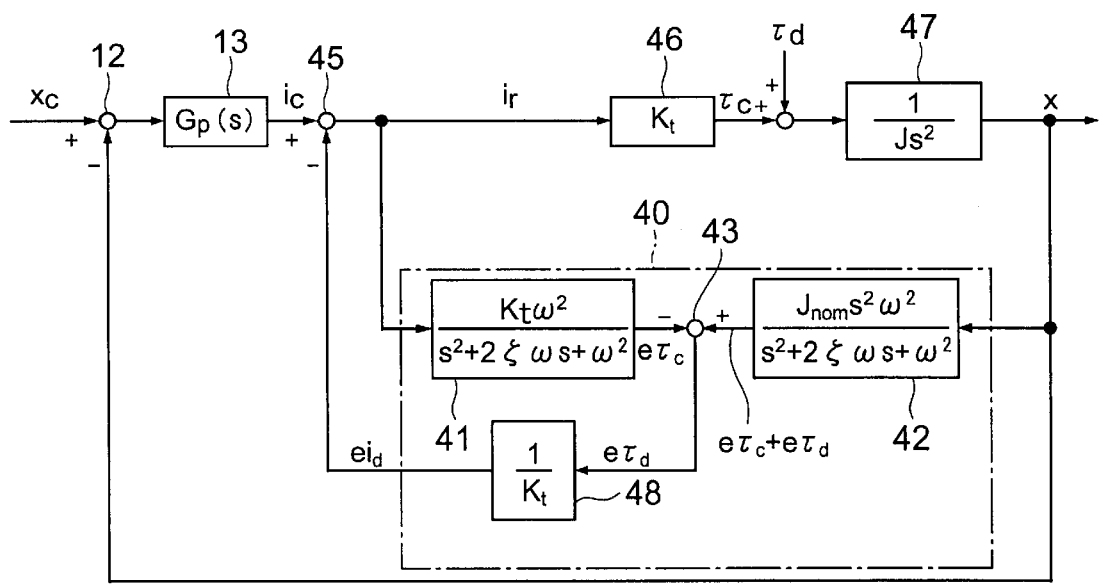
FIG. 5 is a block diagram for explaining transfer functions of components illustrated in FIG. 4.

FIG. 5 is a block diagram of the position control system shown in FIG. 4. Referring to FIG. 5, the operation of the disturbance observer 40 will be described. In symbols written in boxes in FIG. 5, numerals 13, 41, and 42 indicate transfer functions of the respective corresponding constituent elements shown in FIG. 4. That is, the PID controller 13 is defined as the transfer function [$G_p(s)$], the low-pass filter 41 as the transfer function [$(K_t\omega^2)/(s^2+2\zeta\omega s+\omega^2)$], and the input torque estimating filter 42 as the transfer function [$(J_{nom}s^2\omega^2)/(s^2+2\zeta\omega s^2+\omega^2)$]. In these transfer functions, $\omega$ represents a cut-off frequency, $\zeta$ represents a damping coefficient of the filter, s represents a Laplace operator, and $J_{nom}$ represents an inertia term of a discipline model in a movable portion. Furthermore, numeral 46 denotes the torque constant ($K_t$) of the motor M, numeral 47 denotes the transfer function ($1/Js^2$) of a controlled object, namely, the mechanism including the motor M and the load L, and numeral 48 denotes the inverse number ($1/K_t$) of the torque constant of the motor M.

The low-pass filter 41 filters the torque command value $\tau_c$ by multiplying the current command value $i_r$ by the torque constant $K_t$ and filters the calculated torque command value $\tau_c$ in the disturbance suppression frequency bandwidth and calculates an estimated torque command value $e\tau_c$. The input torque estimating filter 42 calculates an estimated value ($e\tau_c+e\tau_d$) of an input torque ($\tau_c+\tau_d$) from the detected positional value x on the basis of an inverse model of a transfer function 46 from the input torque of the mechanism including the motor M and the load L to the position. By giving the same filtering function as that of the low-pass filter 41 also to the input torque-estimating filter 42, the estimated input torque value ($e\tau_c+e\tau_d$) is calculated only in the disturbance suppression frequency bandwidth.

Furthermore, an estimated disturbance torque value $e\tau_d$ is calculated from the finite difference $e\tau_d$ between the estimated disturbance torque value $e\tau_c$ and the estimated input torque value ($e\tau_c+e\tau_d$) in the inverse model of a motor torque constant 44. The estimated disturbance torque value $e\tau_d$ calculated in such a manner is multiplied by an inverse number ($1/K_t$) of the torque constant of the motor M so as to calculate a current correction value $ei_d$. In the subtractor 45, the current correction value $ei_d$ is subtracted from the current target value $i_c$ to have the current command value $i_r$ for the motor drive 14.

Figure 6:
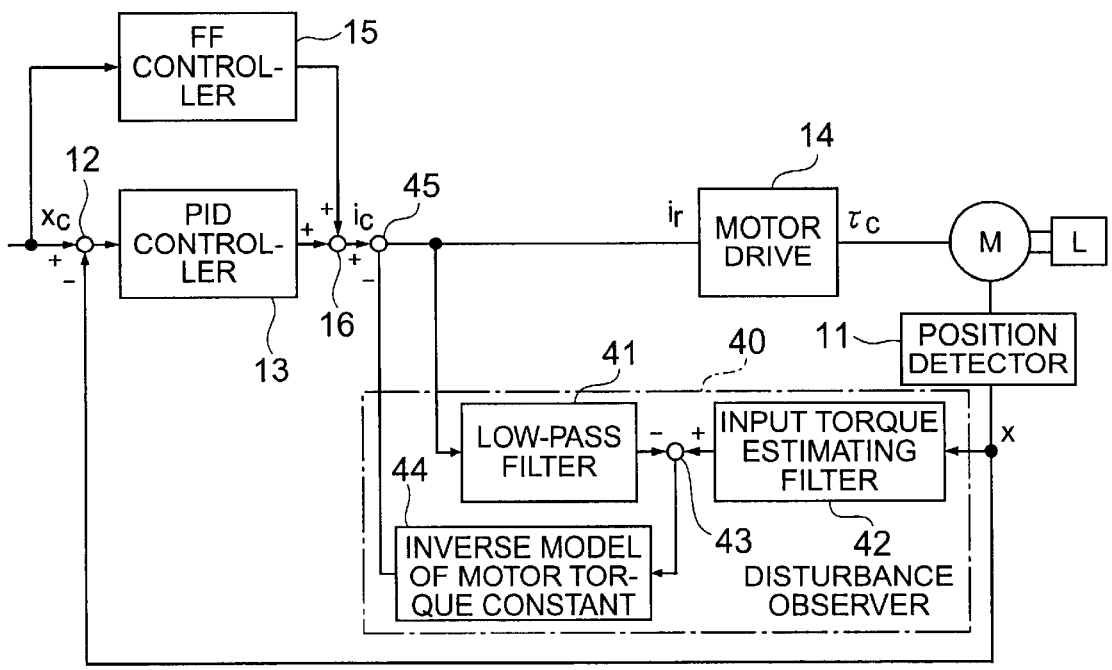
FIG. 6 is a block diagram of a position control system employing a PID and FF control method according to a second embodiment of the present invention.

FIG. 6 shows a second embodiment in which the present invention is applied to a position control system employing PID and FF control methods, and the FF controller 15 and the adder 16 are added to the structure shown in FIG. 4. That is, one of inputs of the adder 16 is connected to the output side of the PID controller 13, and the FF controller 15 is connected to the input side of the positional command value $x_c$ in the subtractor 12 and to the other input side of the adder 16.

The FF controller 15 multiplies the positional command value $x_c$ by a control gain so that the positional command value $x_c$ and the positional detected value x coincide with each other. The multiplied result is added to the output of the PID controller 13 to calculate the current target value $i_c$ for the motor drive 14. Operation of other constituent components is the same as that of the first embodiment described by referring to FIGS. 4 and 5.

Figure 7:
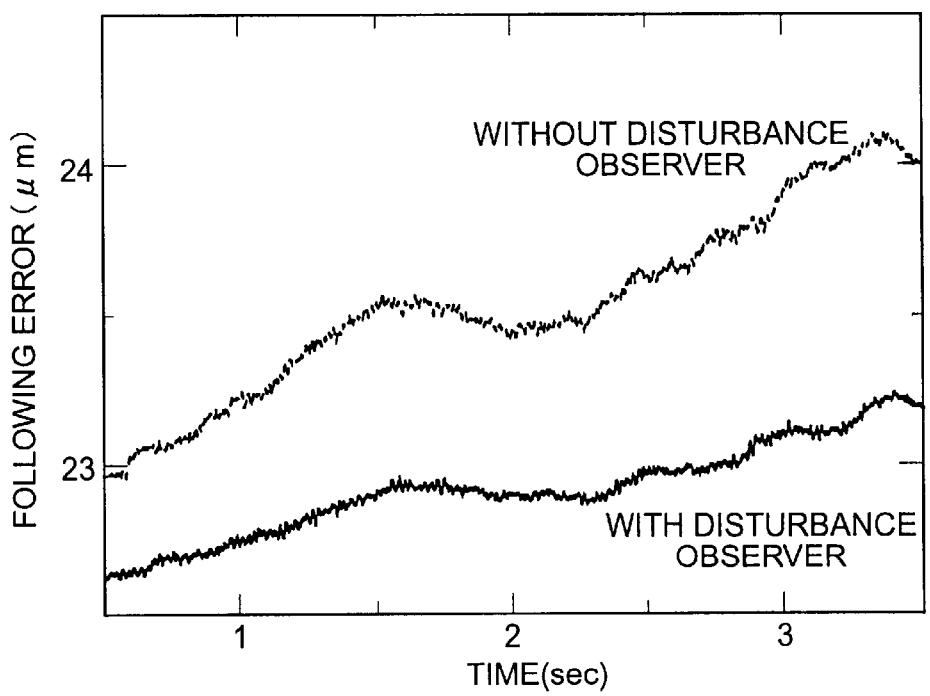
FIG. 7 is a graph showing measured results of effects on a constant velocity when the present invention is applied to a precision stage mechanism using static air bearings and a linear motor.

Specifically, when the present invention is applied to a precision stage driving mechanism employing the static air bearings (air slider) and a linear motor, an example of measured data of constant velocity effects is shown in FIG. 7. FIG. 7 shows changes in a following error when moving at a constant velocity. An addition of the disturbance observer 40 according to the present invention enables the changes in a following error to be reduced. A primary factor of the disturbance is considered to be changes in a thrust ripple and in tension of cables (electrical and pneumatic) due to inequality of a magnetic circuit of the linear motor (identical to general rotary motors). Generally, the disturbance certainly exists in common products and troublesome cases increase with trends toward high accuracies of recent apparatuses. The present invention is advantageous for these problems.

Figure 8:
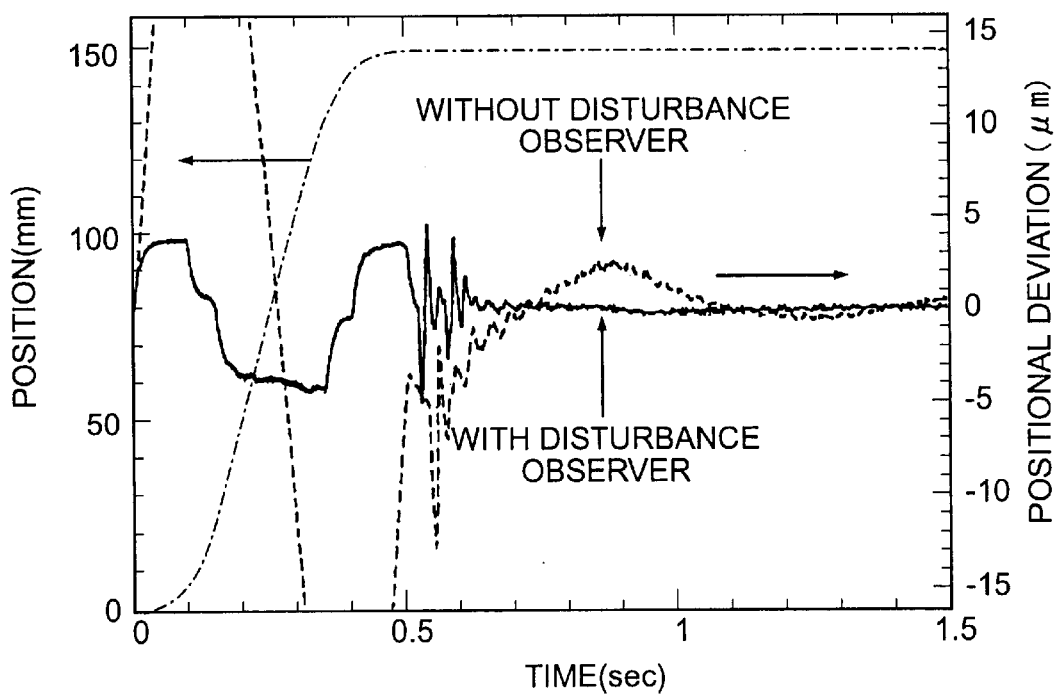
FIG. 8 is a graph showing measured results of effects on positioning characteristics when the present invention is applied to the precision stage mechanism using the static air bearings and the linear motor.

FIG. 8 shows measured effects on positioning characteristics when the present invention is applied to a precision stage driving mechanism employing the static air bearings (air slider) and a linear motor. FIG. 8 shows deviation of positioning when step moving by 150 mm. In controlling without the disturbance observer 40, residual vibration due to base member vibration exists during positioning; however, addition of the disturbance observer 40 according to the present invention enables the residual vibration to be effectively suppressed. Generally, an X-Y stage driving mechanism is fixed on a vibration-proof base member for elimination of floor vibration, and the residual vibration during positioning generally exists for sure, so that this becomes a problem when increasing the throughput of the apparatus. The present invention is also advantageous for this problem.

Figure 9:
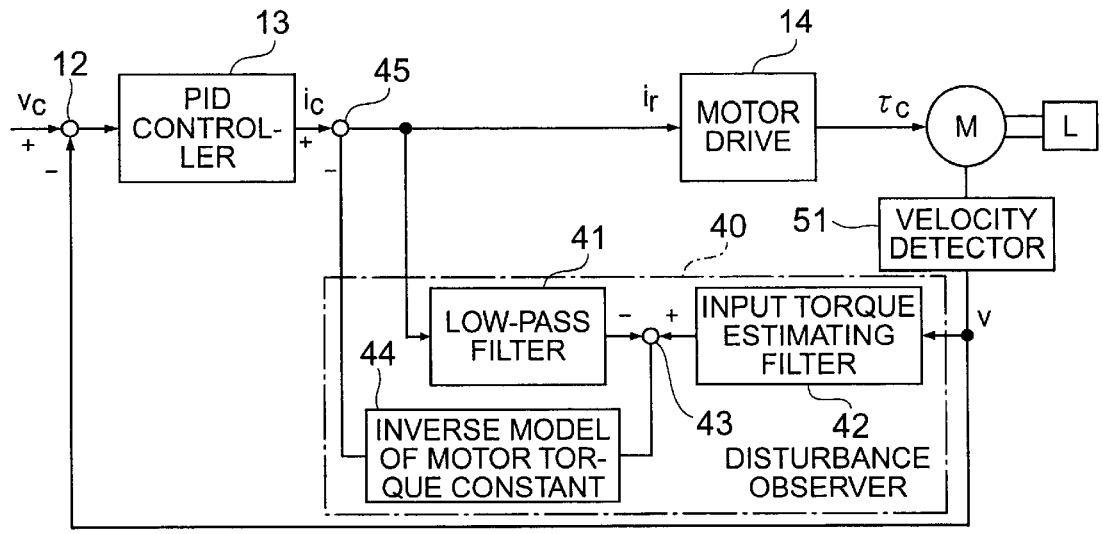
FIG. 9 is a block diagram of a velocity control system employing a PID control method according to a third embodiment of the present invention.
Figure 10:
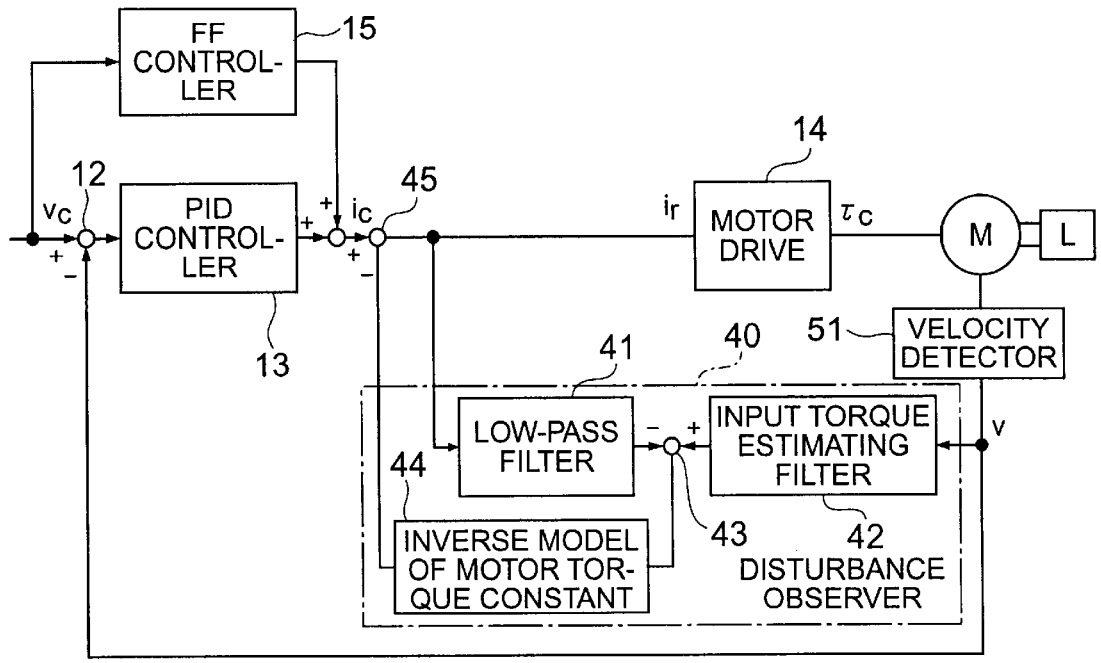
FIG. 10 is a block diagram of a velocity control system employing a PID and FF control method according to a fourth embodiment of the present invention.

The present invention has been described above by applying it to a precision stage driving mechanism; however, the present invention also is widely applicable to position and velocity control methods of apparatuses for moving and positioning objects. When the present invention is applied to a velocity control method, as illustrated in FIGS. 9 and 10, the positional command value is to be a velocity command value $v_c$ and a velocity detector 51 for detecting a velocity v of the motor M is used instead of the position detector 11. FIG. 9 illustrates a velocity control system which is a third embodiment of the present invention and which corresponds to the position control system of FIG. 4. FIG. 10 illustrates a velocity control system which is a fourth embodiment of the present invention and which corresponds to the position control system of FIG. 6. An input load torque is estimated from the velocity v detected by the velocity detector 51 on the basis of an inverse model of a transfer function from an input torque of a mechanism including the motor M and the load L to a velocity. Operation of other constituent components is the same as that of the first and second embodiments described by referring to FIGS. 4 and 6.

The first through fourth embodiments have been described above by applying them to the one-axial stage driving mechanism shown in FIG. 3. However, the present invention is also applicable to a two-axial driving mechanism or further to three-axial or more driving mechanisms.

At any rate, the present invention provides a position control system and a velocity control system capable of improving the performance in constant velocity and a positioning time by estimating and compensating the disturbance in the control system without changing the hardware structure of the control system.

What is claimed is:

1. A position control system of a stage driving mechanism which drives a stage at least in one-axial direction, the position control system comprising:
   a position detector for detecting a position of the stage;
   a feedback control system for controlling a motor, which is a driving source of the stage, on the basis of a detected positional value obtained from the position detector and a positional command value;
   a Proportional Integral Derivative (PID) controller for generating a current target value for the motor from the difference between the detected positional value and the positional command value; and
   a disturbance observer comprising a signal processing unit for carrying out high-speed calculation according to a predetermined program,
   wherein the signal processing unit has a filtering function to filter a torque command value for the motor, an input torque estimating and filtering function carrying out estimation for obtaining an estimated input load torque from the detected positional value, and a function to calculate an estimated disturbance load torque from the difference between the filtered torque command value and the estimated input load torque and to calculate a correction value for the current target value so as to cancel a disturbance torque by multiplying the estimated disturbance load torque by an inverse number of a motor torque constant.

2. A position control system according to claim 1, further comprising:
   a Feed Forward (FF) controller connected in parallel with the PID controller for multiplying the positional command value by a predetermined control gain; and
   an adder connected to the output side of the PID controller for adding the output of the PID controller to the output of the FF controller, the adder producing an added result as the current target value.

3. A position control system according to claim 2, wherein the motor is a linear motor.

4. A position control system according to claim 1, wherein the motor is a linear motor.

5. A position control system of a stage driving mechanism which drives a stage at least in one-axial direction, the position control system comprising:
   a position detector for detecting a position of the stage; and
   a feedback control system for controlling a linear motor, which is a driving source of the stage, on the basis of a detected positional value obtained from the position detector and a positional command value, the feed back control system comprising the position detector, a first calculator for calculating a first difference between the detected positional value and the positional command value, a Proportional Integral Derivative (PID) controller connected to the first calculator for generating a current target value for the linear motor from the first difference, and a motor drive connected to the PID controller for generating a torque command value for the linear motor, and
   wherein the position control system further comprises:
   a second calculator inserted and connected between the PID controller and the motor drive source; and a disturbance observer connected to the output side of the second calculator, the output side of the position detector, and one input side of the second calculator, the disturbance observer comprising a signal processing unit for carrying out high-speed calculation according to a predetermined program, wherein the signal processing unit comprises:

a low-pass filter for filtering the torque command value for the linear motor;

an input torque estimating filter carrying out estimation for obtaining an estimated input load torque from the detected positional value;

a third calculator for calculating a third difference between the filtered torque command value and the estimated input load torque; and an inverse model of a motor torque constant for calculating an estimated disturbance load torque from the third difference and for calculating a correction value for the current target value so as to cancel a disturbance torque by multiplying the estimated disturbance load torque calculated above by an inverse number of the motor torque constant, and wherein the second calculator calculates a second difference by subtracting the current target value of the PID controller from the correction value of the inverse model of the motor torque constant and produces the second difference to the motor drive as a current command value.

6. A position control system according to claim 5, further comprising:

a Feed Forward (FF) controller connected in parallel with the PID controller for multiplying the positional command value by a predetermined control gain; and an adder connected to the output side of the PID controller for adding the output of the PID controller to the output of the FF controller, the adder producing an added result as the current target value, wherein the second calculator subtracts the output value of the inverse model of the motor torque constant from the added result of the adder.

7. A velocity control system of a stage driving mechanism which drives a stage at least in one-axial direction, the velocity control system comprising:

a velocity detector for detecting a velocity of the stage;

a feedback control system for controlling a motor, which is a driving source of the stage, on the basis of a detected velocity value obtained from the velocity detector and a velocity command value;

a Proportional Integral Derivative (PID) controller for generating a current target value for the motor from the difference between the detected velocity value and the velocity command value; and a disturbance observer comprising a signal processing unit for carrying out high-speed calculation according to a predetermined program, wherein the signal processing unit has a filtering function to filter a torque command value for the motor, an input torque estimating and filtering function carrying out estimation for obtaining an estimated input load torque from the detected velocity value, and a function to calculate an estimated disturbance load torque from the difference between the filtered torque command value and the estimated input load torque and to calculate a correction value for the current target value so as to cancel a disturbance torque by multiplying the esti-
mated disturbance load torque calculated above by an inverse number of a motor torque constant.

8. A velocity control system according to claim 7, further comprising:

a Feed Forward (FF) controller connected in parallel with the PID controller for multiplying the velocity command value by a predetermined control gain; and an adder connected to the output side of the PID controller for adding the output of the PID controller to the output of the FF controller, the adder producing an added result as the current target value.

9. A velocity control system according to claim 8, wherein the motor is a linear motor.

10. A velocity control system according to claim 7, wherein the motor is a linear motor.

11. A velocity control system of a stage driving mechanism which drives a stage at least in one-axial direction, the velocity control system comprising:

a velocity detector for detecting a velocity of the stage; and a feedback control system for controlling a linear motor, which is a driving source of the stage, on the basis of a detected velocity value obtained from the velocity detector and a velocity command value, the feedback control system comprising the velocity detector, a first calculator for calculating a first difference between the detected velocity value and the velocity command value, a Proportional Integral Derivative (PID) controller connected to the first calculator for generating a current target value for the linear motor from the first difference, and a motor drive connected to the PID controller for generating a torque command value for the linear motor, and wherein the velocity control system further comprises:

a second calculator inserted and connected between the PID controller and the motor drive; and a disturbance observer connected to the output side of the second calculator, the output side of the position detector, and one input side of the second calculator, the disturbance observer comprising a signal processing unit for carrying out high-speed calculation according to a predetermined program, wherein the signal processing unit comprises:

a low-pass filter for filtering the torque command value for the linear motor;

an input torque estimating filter carrying out estimation for obtaining an estimated input load torque from the detected velocity value;

a third calculator for calculating a third difference between the filtered torque command value and the estimated input load torque; and an inverse model of a motor torque constant for calculating an estimated disturbance load torque from the third difference and for calculating a correction value for the current target value so as to cancel a disturbance torque by multiplying of the estimated disturbance load torque calculated above by an inverse number of the motor torque constant, and wherein the second calculator calculates a second difference by subtracting the correction value of the inverse model of the motor torque constant from the current target value of the PID controller.

12. A velocity control system according to claim 11, further comprising:

a Feed Forward (FF) controller connected in parallel with the PID controller for multiplying the velocity command value by a predetermined control gain; and an adder connected to the output side of the PID controller for adding the output of the PID controller to the output of the FF controller, the adder producing an added result as the current target value, wherein the second calculator subtracts the output value of the inverse model of the motor torque constant from the added result of the adder.

13. A position control system of a stage driving mechanism which drives a stage at least in one-axial direction, the position control system comprising:

a position detector for detecting a position of the stage; and a feedback control system for controlling a motor, which is a driving source of the stage, on the basis of a detected positional value obtained from the position detector and a positional command value, the feed back control system comprising the position detector, a first calculator for calculating a first difference between the detected positional value and the positional command value, a Proportional Integral Derivative (PID) controller connected to the first calculator for generating a current target value for the motor from the first difference, and a motor drive connected to the PID controller for generating a torque command value $\tau_c$ for the motor, and wherein the position control system further comprises:

a second calculator inserted and connected between the PID controller and the motor drive; and a disturbance observer connected to the output side of the second calculator, the output side of the position detector, and one input side of the second calculator, the disturbance observer comprising a signal processing unit for carrying out high-speed calculation according to a predetermined program, wherein the signal processing unit comprises:

a low-pass filter for calculating the torque command value $\tau_c$ by multiplying a current command value $i_r$ for the motor by a motor torque constant $K_t$ and for filtering the calculated torque command value;

an input torque estimating filter for calculating an estimated input load torque from the detected positional value on the basis of an inverse model $J_{nom}s^2$ of a transfer function $1/Js^2$ from the input torque of the mechanism including the motor and the load to the position;

a third calculator for calculating a third difference between the filtered torque command value and the estimated input load torque; and an inverse model of the motor torque constant $K_t$ for calculating an estimated disturbance load torque from the third difference and for calculating a correction value for the current target value so as to cancel a disturbance torque by multiplying the estimated disturbance load torque calculated above by an inverse number $1/K_t$ of the motor torque constant $K_t$, and wherein the second calculator calculates a second difference by subtracting the output value of the PID controller from the output value of the inverse model of the motor torque constant and produces the second difference to the motor drive as the current command value $i_r$.

14. A velocity control system of a stage driving mechanism which drives a stage at least in one-axial direction, the velocity control system comprising:

a velocity detector for detecting a velocity of the stage; and a feedback control system for controlling a motor, which is a driving source of the stage, on the basis of a detected velocity value obtained from the velocity detector and a velocity command value, the feed back control system comprising the velocity detector, a first calculator for calculating a first difference between the detected velocity value and the velocity command value, a Proportional Integral Derivative (PID) controller connected to the first calculator for generating a current target value for the motor from the first difference, and a motor drive connected to the PID controller for generating a torque command value $\tau_c$ for the motor, and wherein the velocity control system further comprises:

a second calculator inserted and connected between the PID controller and the motor drive; and a disturbance observer connected to the output side of the second calculator, the output side of the velocity detector, and one input side of the second calculator, the disturbance observer comprising a signal processing unit for carrying out high-speed calculation according to a predetermined program, wherein the signal processing unit comprises:

a low-pass filter for calculating the torque command value $\tau_c$ by multiplying a current command value $i_r$ for the motor by a motor torque constant $K_t$ and for filtering the calculated torque command value;

an input torque estimating filter for calculating an estimated input load torque from the detected velocity value on the basis of an inverse model $J_{nom}s^2$ of a transfer function $1/Js^2$ from the input torque of the mechanism including the motor and the load to the position;

a third calculator for calculating a third difference between the filtered torque command value and the estimated input load torque; and an inverse model of the motor torque constant $K_t$ for calculating an estimated disturbance load torque from the third difference and for calculating a correction value for the current target value so as to cancel a disturbance torque by multiplying the estimated disturbance load torque calculated above by an inverse number $1/K_t$ of the motor torque constant $K_t$, and wherein the second calculator calculates a second difference by subtracting the output value of the inverse model of the motor torque constant from the output value of the PID controller and produces the second difference to the motor drive as the current command value $i_r$.

* * * * *